(12) United States Patent
Kakutani

(10) Patent No.: US 8,705,128 B2
(45) Date of Patent: Apr. 22, 2014

(54) IMAGE PROCESSING DEVICE, PRINTING DEVICE, IMAGE PROCESSING METHOD, AND IMAGE PROCESSING PROGRAM

(75) Inventor: Toshiaki Kakutani, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 118 days.

(21) Appl. No.: 13/428,486

(22) Filed: Mar. 23, 2012

(65) Prior Publication Data

US 2012/0243013 A1 Sep. 27, 2012

(30) Foreign Application Priority Data

Mar. 24, 2011 (JP) ................................. 2011-066007

(51) Int. Cl.
*H04N 1/60* (2006.01)
(52) U.S. Cl.
USPC ......... 358/1.9; 358/3.13; 358/3.15; 358/3.27; 382/266
(58) Field of Classification Search
USPC ............... 358/1.9, 2.1, 2.99, 3.02, 3.03, 3.06, 358/3.13, 3.15, 3.27, 252, 266; 382/252, 382/266
See application file for complete search history.

(56) References Cited

U.S. PATENT DOCUMENTS

| | | | |
|---|---|---|---|
| 6,671,068 B1 * | 12/2003 | Chang et al. | ................... 358/1.9 |
| 7,431,413 B2 | 10/2008 | Mizutani et al. | |
| 7,450,280 B2 * | 11/2008 | Hayashi | ........................ 358/3.27 |
| 7,474,443 B2 | 1/2009 | Mizutani et al. | |
| 7,961,962 B2 * | 6/2011 | Cittadini et al. | .............. 382/237 |
| 2005/0286791 A1 * | 12/2005 | Katohgi | ........................ 358/3.03 |
| 2006/0181738 A1 * | 8/2006 | Mizutani et al. | ............. 358/3.02 |
| 2007/0133060 A1 * | 6/2007 | Cittadini et al. | .............. 358/3.06 |
| 2011/0063684 A1 | 3/2011 | Kakutani | |

FOREIGN PATENT DOCUMENTS

| | | | | | |
|---|---|---|---|---|---|
| JP | 09135349 | A | * | 5/1997 | ............ H04N 1/405 |
| JP | 2001-292320 | A | | 10/2001 | |
| JP | 2003-234893 | A | | 8/2003 | |
| JP | 2006-067347 | A | | 3/2006 | |
| JP | 2006-140579 | A | | 6/2006 | |
| JP | 2011-066594 | A | | 3/2011 | |

* cited by examiner

*Primary Examiner* — Kimberly A Williams
(74) *Attorney, Agent, or Firm* — Global IP Counselors, LLP

(57) ABSTRACT

Provided is an image processing device for comparing a determination value adjusted by comparing the gradation values of pixels included in inputted image data and threshold values of a dither mask prepared in advance, and a corrected gradation value obtained by correcting the gradation value of the pixel by the diffusion error from an adjacent processed pixel; adjusting a determination value; generating dot data which indicate the presence or absence of the dot formation by applying error diffusion; and reducing the width of the adjustment of the determination value used in determining the dot formation so that the width of the adjustment is smaller in comparison with non-edge pixels in the case that a pixel is determined to be an edge pixel for which the difference in gradation value in relation to an adjacent pixel is equal to or greater than a predetermined value.

10 Claims, 7 Drawing Sheets

| | Provisional Dithering Results | | Threshold Value Difference | Dot Data Characteristics |
|---|---|---|---|---|
| | Dot On | Dot Off | | |
| Edge Pixel | Error Diffusion Threshold Value: EDTH-0 (Low Threshold Value) | Error Diffusion Threshold Value: EDTH+0 (High Threshold Value) | 0 | Error Diffusion Method Element: Large |
| Non-Edge Pixel | Error Diffusion Threshold Value: EDTH-64 (Low Threshold Value) | Error Diffusion Threshold Value: EDTH+64 (High Threshold Value) | 128 | Dither Method Element: Large |

Fig. 7

IMAGE PROCESSING DEVICE, PRINTING DEVICE, IMAGE PROCESSING METHOD, AND IMAGE PROCESSING PROGRAM

CROSS-REFERENCE TO RELATED APPLICATIONS

This application claims priority to Japanese Patent Application No. 2011-066007 filed on Mar. 24, 2011. The entire disclosure of Japanese Patent Application No. 2011-066007 is hereby incorporated herein by reference.

BACKGROUND

1. Technical Field

The present invention relates to a printing technique for printing image data which represent a predetermined image, and more particularly relates to a technique for generating dot data which indicate the presence or absence of dot formation.

2. Background Technology

Dithering and error diffusion are widely known as techniques (hereinafter referred to as halftone techniques) for expressing the gradations of an image by an expression method having fewer gradations than the original image. Since dithering and error diffusion each have advantages and disadvantages, there has been a need for halftone processing which combines dithering-type factors and error diffusion method elements. For example, Patent Citations 1 and 2 below disclose techniques of halftone processing in which dithering-type factors and error diffusion method elements are combined by using a dither mask of an ordered dithering method on the error diffusion threshold value to periodically vary the threshold value.

However, in the techniques of Patent Citations 1 and 2, the degree to which dithering-type factors and error diffusion method elements contribute is difficult to control according to the characteristics of the print image data that are to be subjected to halftone processing.

Japanese Laid-open Patent Publication No. 2001-292320 (Patent Document 1), Japanese Laid-open Patent Publication No. 2003-234893 (Patent Document 2), Japanese Laid-open Patent Publication No. 2006-140579 (Patent Document 3) and Japanese Laid-open Patent Publication No. 2006-67347 (Patent Document 2) are examples of the related art.

SUMMARY

Problems to be Solved by the Invention

In view of at least some of the problems described above, an advantage of the invention is to provide an image processing technique which incorporates dithering-type factors and error diffusion method elements by a well-known method.

Means Used to Solve the Above-Mentioned Problems

The invention can incorporate the embodiments or application examples described below in order to achieve at least some of the abovementioned advantages.

Application Example 1

An image processing device for processing image data which indicate an image by a gradation value for each pixel includes: an image data input unit for inputting the image data; a determination value adjustment unit for comparing the gradation values of pixels included in the image data, and threshold values of a dither mask prepared in advance and adjusting a determination value; a dot data generator for performing processing for generating dot data which indicate the presence or absence of the dot formation by applying error diffusion for comparing the adjusted determination value with a corrected gradation value obtained by correcting the gradation value of the pixel by the diffusion error from an adjacent processed pixel, and diffusing the error with respect to the gradation value that occurs according to the presence or absence of the dot formation when the presence or absence of formation of a dot is determined by the comparison; and a dot data output unit for outputting the generated dot data; wherein the determination value adjustment unit reduces the width of the adjustment of the determination value used in determining the dot formation so that the width of the adjustment is smaller in comparison with non-edge pixels in the case that a pixel is determined to be an edge pixel for which the difference in gradation value in relation to an adjacent pixel is equal to or greater than a predetermined value.

Through this image processing device, since the dither mask threshold value and the gradation value of a pixel are compared to adjust the determination value, and the determination value is subsequently used to generate dot data by error diffusion, in determining the presence or absence of dot formation for each pixel, in the case that the pixel is an edge pixel, the width of adjustment of the determination value used to determine dot formation is reduced in comparison with non-edge pixels, and it is possible to generate dot data for edge pixels in which error diffusion method elements are strengthened in comparison with non-edge pixels.

Application Example 2

In the image processing device according to Application Example 1, the determination value adjustment unit adjusts the determination value by a predetermined width so that the determination value that is applied in the case that the gradation value of the pixel exceeds the threshold value does not exceed the determination value that is applied in the case that the gradation value of the pixel is equal to or less than the threshold value.

Through this image processing device, the determination value can be adjusted as appropriate according to the gradation value of the pixel, and it is possible to generate a dot pattern in which error diffusion method elements (having excellent dispersion properties or continuity of dots) are strengthened, or a dot pattern in which dithering-type factors (characteristics provided by the dither mask that is used) are strengthened.

Application Example 3

In the image processing device according to Application Example 1, the determination value adjustment unit increases the width of the adjustment of the determination value through a plurality of levels as the distance from the edge pixel increases when the determination value is applied to a pixel other than the edge pixel.

Through this image processing device, since the width of the adjustment of the determination value is increased through a plurality of levels as the distance from the edge pixel increases, it is possible to generate dot data in which error diffusion method elements are most strengthened for edge pixels, and dithering-type factors are strengthened incrementally as the distance from the edge pixels increases.

Application Example 4

In the image processing device according to Application Example 1, the determination value adjustment unit determines that either a pixel on a high-gradation side or a pixel on a low-gradation side is the edge pixel among pixels in which the difference in gradation value with respect to an adjacent pixel is equal to or greater than a predetermined value.

Through this image processing device, since pixels only on a higher-gradation side or a low-gradation side among pixels constituting an edge are determined to be edge pixels, it is possible to minimized processing for generating dot data in which error diffusion method elements are strengthened.

Application Example 5

In the image processing device according to Application Example 1, the dither mask has a blue noise characteristic.

Through this image processing device, since the dither mask has a blue noise characteristic, in the case of generating dot data in which dithering-type factors are strengthened, it is possible to generate dot data having excellent dispersion properties/grain properties.

Application Example 6

In the image processing device according to Application Example 1, the width of the adjustment of the determination value for the edge pixel is zero.

Through this image processing device, since the presence or absence of dot formation is determined with the adjustment of the determination value set to zero for edge pixels, it is possible to generate dot data in which dithering-type factors are essentially eliminated for edge pixels and error diffusion method elements are strengthened to the maximum degree.

Application Example 7

A printing device for printing image data which indicate an image by a gradation value for each pixel includes: an image data input unit for inputting the image data; a dot data generator for performing processing for generating dot data which indicate the presence or absence of the dot formation by applying error diffusion for comparing, with a determination value, a corrected gradation value obtained by correcting the gradation value of each pixel included in the image data by the diffusion error from an adjacent processed pixel, and diffusing the error with respect to the gradation value that occurs according to the presence or absence of the dot formation when the presence or absence of formation of a dot is determined by the comparison; a determination value adjustment unit for comparing, prior to comparison of the corrected gradation value and the determination value, the gradation value of the pixel and a threshold value of a dither mask prepared in advance, and adjusting the determination value by a predetermined width so that the determination value that is applied in the case that the gradation value of the pixel exceeds the threshold value does not exceed the determination value that is applied in the case that the gradation value of the pixel is equal to or less than the threshold value; and a printing unit for printing the image by using the generated dot data; wherein the determination value adjustment unit reduces the width of the adjustment of the determination value used in determining the dot formation so that the width of the adjustment is smaller in comparison with non-edge pixels in the case that the pixel is an edge pixel for which the difference in gradation value in relation to an adjacent pixel is equal to or greater than a predetermined value.

Through this printing device, prior to generation of dot data by error diffusion, the threshold value of dither mask and the gradation value of a pixel are compared, and the determination value is adjusted by a predetermined width so that the determination value that is applied in the case that the gradation value of the pixel exceeds the threshold value does not exceed the determination value that is applied in the case that the gradation value of the pixel is equal to or less than the threshold value. Therefore, depending upon the manner in which the determination value is adjusted, it is possible to generate a dot pattern in which error diffusion method elements (having excellent dispersion properties or continuity of dots) are strengthened, or a dot pattern in which dithering-type factors (characteristics provided by the dither mask that is used) are strengthened. Furthermore, in this printing device, when the presence or absence of dot formation is determined for each pixel, in the case that a pixel is an edge pixel, the width of adjustment of the determination value used to determine dot formation is reduced in comparison with pixels other than the edge pixel, and it is therefore possible to generate dot data for edge pixels in which error diffusion method elements are strengthened in comparison with pixels other than the edge pixels. As a result, a print image can be reproduced without interruption of low-density fine lines, text, or the like that are included in the image data.

Application Example 8

An image processing method for processing image data which indicate an image by a gradation value for each pixel includes: an image data input step of inputting the image data; a dot data generation step of performing processing for generating dot data which indicate the presence or absence of the dot formation by applying error diffusion for comparing, with a determination value, a corrected gradation value obtained by correcting the gradation value of each pixel included in the image data by the diffusion error from an adjacent processed pixel, and diffusing the error with respect to the gradation value that occurs according to the presence or absence of the dot formation when the presence or absence of formation of a dot is determined by the comparison; a determination value adjustment step of comparing, prior to comparison of the corrected gradation value and the determination value, the gradation value of the pixel and a threshold value of a dither mask prepared in advance, and adjusting the determination value by a predetermined width so that the determination value that is applied in the case that the gradation value of the pixel exceeds the threshold value does not exceed the determination value that is applied in the case that the gradation value of the pixel is equal to or less than the threshold value; and a dot data output step of outputting the generated dot data; wherein the width of the adjustment of the determination value used in determining the dot formation is reduced in the determination value adjustment step so that the width of the adjustment is smaller in comparison with non-edge pixels in the case that the pixel is an edge pixel for which the difference in gradation value in relation to an adjacent pixel is equal to or greater than a predetermined value.

Through this image processing method, when the presence or absence of dot formation is determined for each pixel, in the case that a pixel is an edge pixel, the width of adjustment of the determination value used to determine dot formation is reduced in comparison with pixels other than the edge pixel, and it is therefore possible to generate dot data for edge pixels in which error diffusion method elements are strengthened in comparison with pixels other than the edge pixels.

BRIEF DESCRIPTION OF THE DRAWINGS

Referring now to the attached drawings which form a part of this original disclosure:

FIG. 7 is a view showing the principle of halftone processing in the first example;

DETAILED DESCRIPTION OF EXEMPLARY EMBODIMENTS

Figure 1:
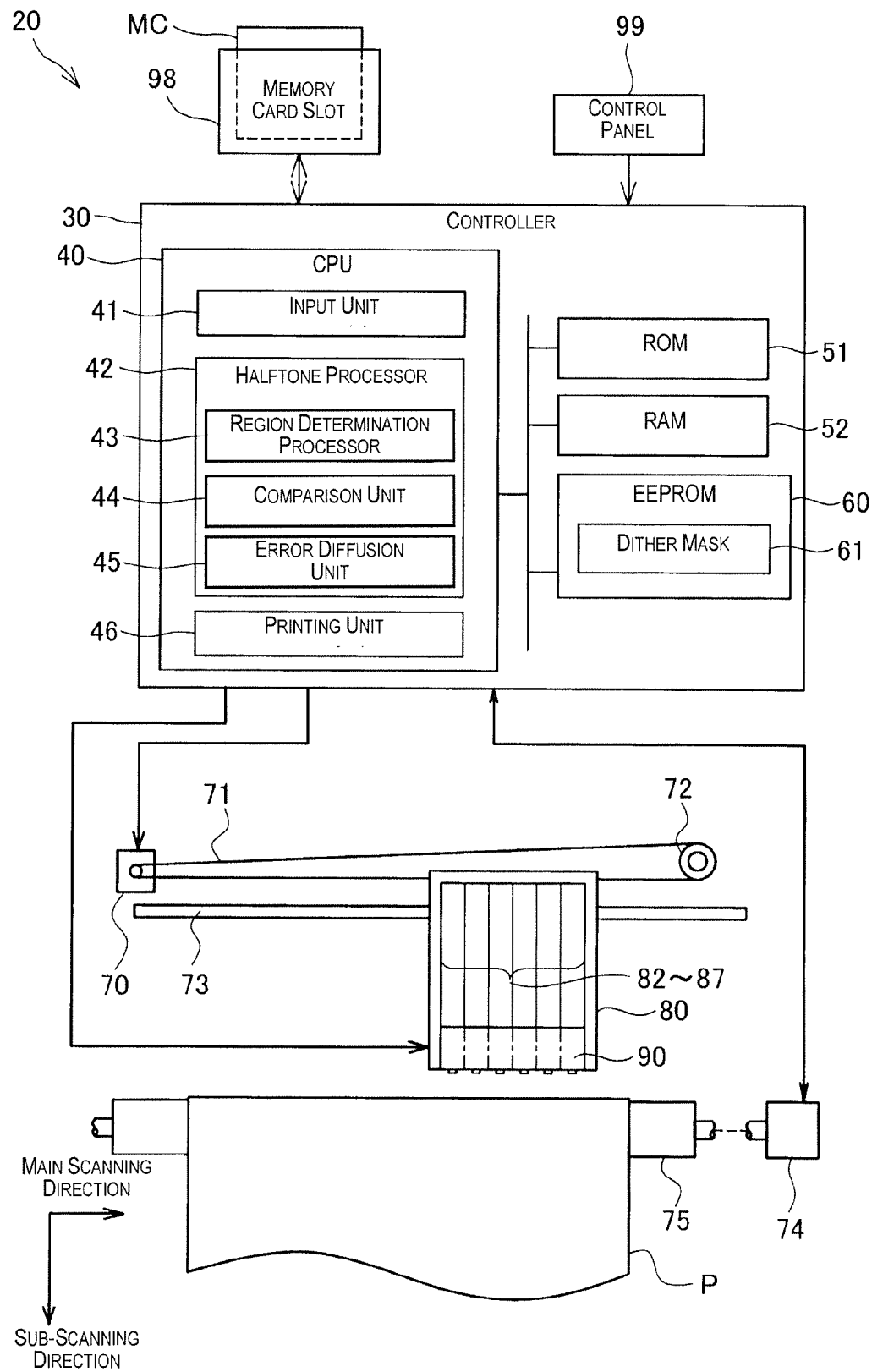
FIG. 1 is a view showing the overall configuration of the printer 20 as a first example.

A. First Example (A1) Device Configuration:

FIG. 1 is a view showing the overall configuration of a printer 20 as a first example of the invention. The printer 20 is a serial inkjet printer for performing the bidirectional printing described hereinafter, and as shown in FIG. 1, the printer 20 is composed of a mechanism for conveying (the conveyance direction is also referred to hereinafter as the sub-scanning direction) a printing medium P through use of a paper feed motor 74; a mechanism for reciprocally moving a carriage 80 in the axial direction (also referred to hereinafter as the main scanning direction) of a platen 75 through use of a carriage motor 70; a mechanism for driving a print head 90 mounted to the carriage 80 to discharge ink and form dots; and a control unit 30 for governing the exchange of signals between the paper feed motor 74, the carriage motor 70, the print head 90, and an control panel 99.

The mechanism for reciprocally moving the carriage 80 in the axial direction of the platen 75 is composed of a slide shaft 73 for retaining the carriage 80 so as to enable the carriage 80 to slide, the slide shaft 73 being provided parallel to the axis of the platen 75; a pulley 72 for suspending an endless drive belt 71 between the pulley 72 and the carriage motor 70; and other components.

Ink cartridges 82 through 87 for color ink, which accommodate cyan ink C, magenta ink M, yellow ink Y, black ink K, light cyan ink Lc, and light magenta ink Lm, respectively, as color inks are mounted to the carriage 80. Nozzle rows corresponding to each color of color ink are formed in the print head 90 at the bottom of the carriage 80. When the ink cartridges 82 through 87 are installed in the carriage 80, ink can be fed to the print head 90 from each cartridge.

In the controller 30, a CPU 40, a ROM 51, a RAM 52, and an EEPROM 60 are connected to each other by a bus. The controller 30 controls the overall operation of the printer 20 by deploying a program stored in the ROM 51 or EEPROM 60 to the RAM 52 and executing the program, and also functions as an input unit 41, a halftone processor 42, and a printing unit 46. The functions of the halftone processor 42 include functioning as a region determination processor 43, a comparison unit 44, and an error diffusion unit 45. The details of these functional units are described hereinafter.

A dither mask 61 is stored in a portion of the EEPROM 60. The dither mask 61 is used in halftone processing by ordered dithering, and is composed of a plurality of threshold values. In the dither mask 61 in the present example, the distribution of threshold values is provided with a so-called blue noise characteristic. A threshold value distribution having a blue noise characteristic is a threshold value distribution in which dots occur with irregularity and the spatial frequency component of set threshold values is largest in high-frequency regions of two pixels or less in each cycle when dots are formed using a dither matrix having such a distribution of threshold values. A threshold value distribution having a green noise characteristic as described hereinafter is a threshold value distribution in which dots occur with irregularity and the spatial frequency component of set threshold values is largest in middle-frequency regions of two to several tens of pixels in each cycle when dots are formed using a dither matrix having such a distribution of threshold values.

In the present example, the dither mask 61 has a predetermined dot formation characteristic. Specifically, the dither mask 61 has a characteristic whereby any of the dot pattern of the dot group formed by forward movement of the carriage 80 in bidirectional printing, the dot pattern of the dot group formed by backward movement, and the dot pattern of the overall dot group formed by the combination of forward and backward movement has satisfactory dot dispersion properties. This technique is described in Japanese Laid-open Patent Publication No. 2007-15359. The dither mask 61 may be one that is configured so that satisfactory dot dispersion properties are obtained for each main scan group which indicates whether dots are formed by any main scan of a plurality of main scans by the carriage 80 instead of or in addition to groups for each abovementioned reciprocal movement.

Satisfactory dot dispersion properties can be specified as the presence of a blue noise characteristic or a green noise characteristic in a dot pattern. Alternatively, satisfactory dot dispersion properties can be specified as the presence of a positive correlation coefficient, preferably, a correlation coefficient of 0.7 or higher, between the spatial frequency distribution of the print image and each spatial frequency distribution of the dither mask threshold values set for the pixels of each of a plurality of groups.

A memory card slot 98 is connected to the controller 30, and image data ORG can be read and inputted from a memory card MC inserted in the memory card slot 98. In the present example, the image data ORG inputted from the memory card MC are data composed of the three color components red (R), green (G), and blue (B).

In the printer 20 having a hardware configuration such as described above, driving the carriage motor 70 causes the print head 90 to reciprocally move in the main scanning direction with respect to the printing medium P, and driving the paper feed motor 74 causes the printing medium P to move in the sub-scanning direction. The controller 30 drives the nozzles at the appropriate timing on the basis of the printing data in conjunction with the reciprocal movement of the carriage 80 and the paper feed movement of the printing medium, and ink dots of the appropriate colors are thereby formed in the appropriate positions on the printing medium P. The printer 20 can thereby print a color image inputted from the memory card MC onto the printing medium P.

Figure 2:
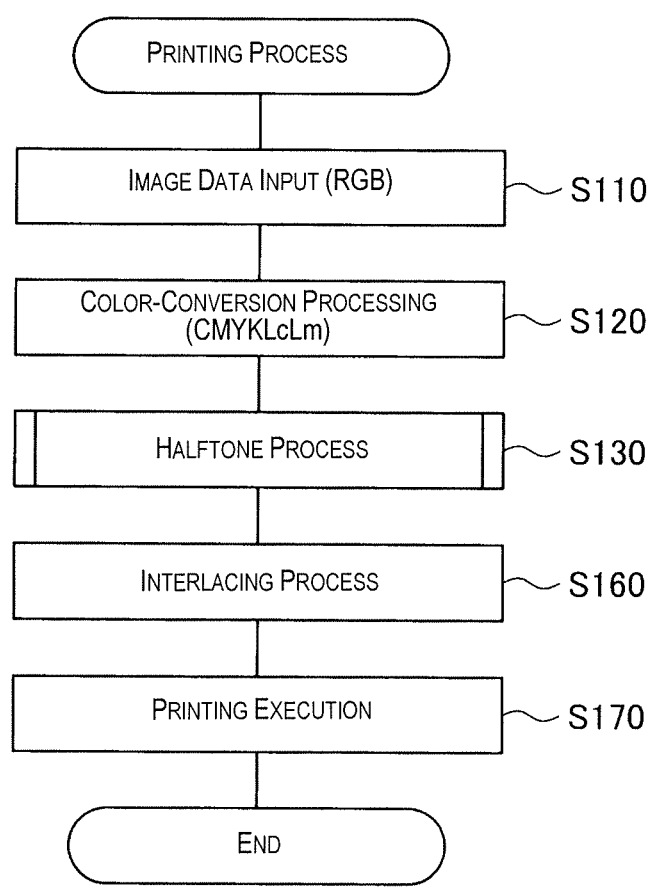
FIG. 2 is a flowchart showing the flow of printing process.

(A2) Printing Process:

The printing process performed in the printer 20 will be described. FIG. 2 is a flowchart showing the flow of printing process in the printer 20. This printing process is started in response to an operation by the user using the control panel 99 or the like issuing an instruction to print a predetermined image stored in the memory card MC. When printing process is started, as the process of the input unit 41, the CPU 40 reads and inputs image data ORG in RGB format as the data to be printed from the memory card MC via the memory card slot 98 (step S110).

When the image data ORG are inputted, the CPU 40 references a lookup table (not shown in the drawings) stored in the EEPROM 60, and converts the image data ORG from RGB format to CMYKLcLm format (step S120).

When color conversion process is performed, as the process of the halftone processor 42, the CPU 40 performs halftone process for converting the image data to dot ON/OFF data of each color (step S130). This halftone process is described in detail hereinafter. The halftone process is not limited to processing for converting to the two values ON and OFF for dots, and can be processing for converting to large dot and small dot ON/OFF data, or other multi-value process. The image data processed in step S130 can also be subjected to resolution conversion process, smoothing, or other image process.

When halftone process is performed, the CPU 40 performs interlace process for ordering into dot pattern data printed in single main scan units, in accordance with the nozzle arrangement, paper feed rate, and other characteristics of the printer 20 (step S160). When interlace process is performed, as the process of the printing unit 46, the CPU 40 drives the print head 90, the carriage motor 70, the paper feed motor 74, and other components to execute printing (step S170).

Figure 3:
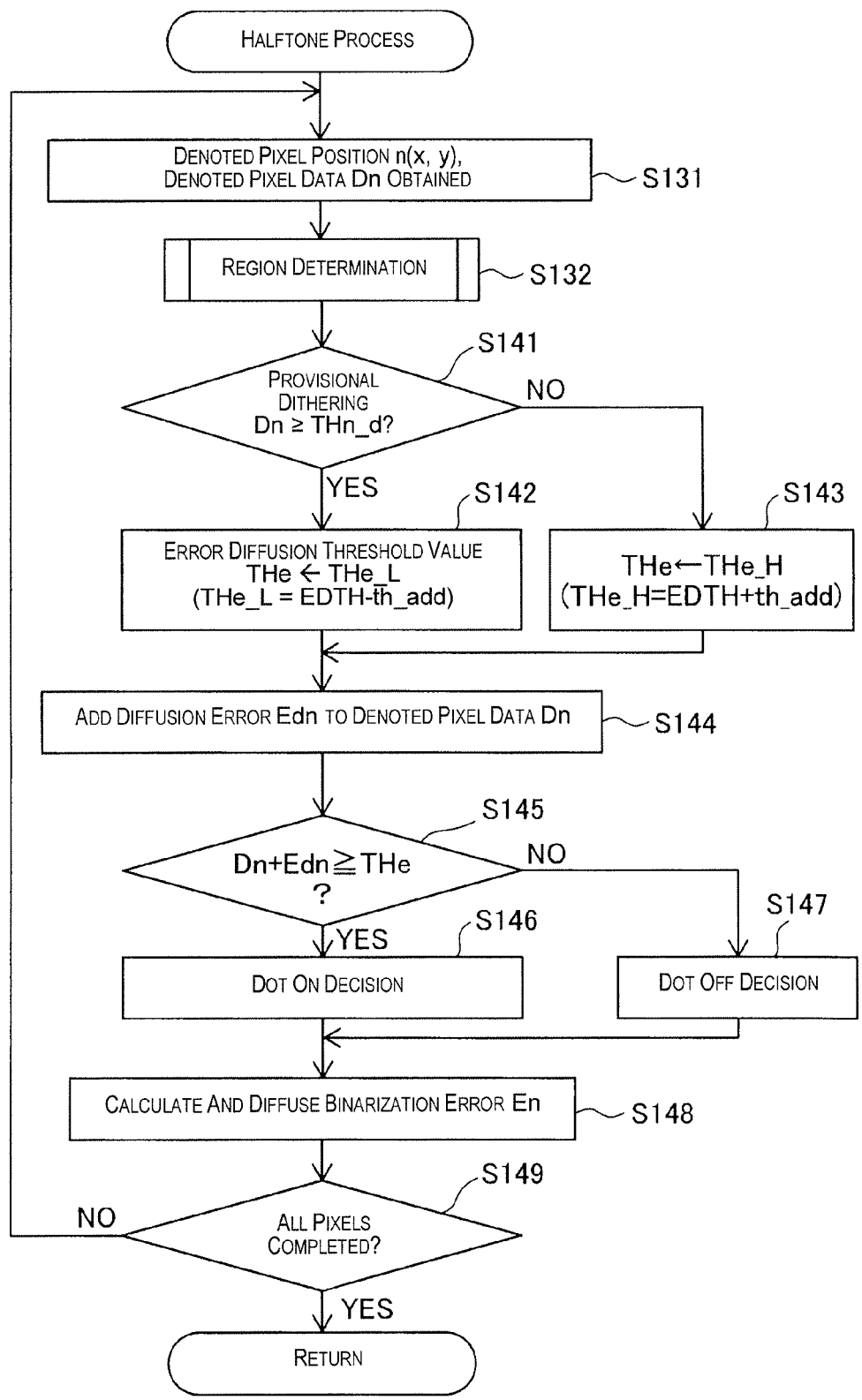
FIG. 3 is a flowchart showing the flow of halftone processing.

(A3) Halftone Process:

Halftone process (step S130) will next be described in detail. FIG. 3 is a flowchart showing the flow of halftone process. When this process is started, the CPU 40 first acquires coordinate data n (x, y) of the position of a denoted pixel, and pixel data Dn for the image data color-converted in step S120 (step S131). When the coordinate data n (x, y) of the position of the denoted pixel and the pixel data Dn are acquired, the CPU 40 performs region determination process as the process of the region determination processor 43 (step S132).

The region determination process (step S132) will be described in detail. The region determination process is processing for determining whether the denoted pixel (x, y) is a pixel on a dense color side (also referred to hereinafter as a higher-density-side edge pixel) among pixels that constitute an edge (also referred to as edge pixels) in the printing image, and assigning, on the basis of the determination result, a threshold value fluctuation parameter th_add as a predetermined parameter used in subsequent halftone process.

Figure 4:
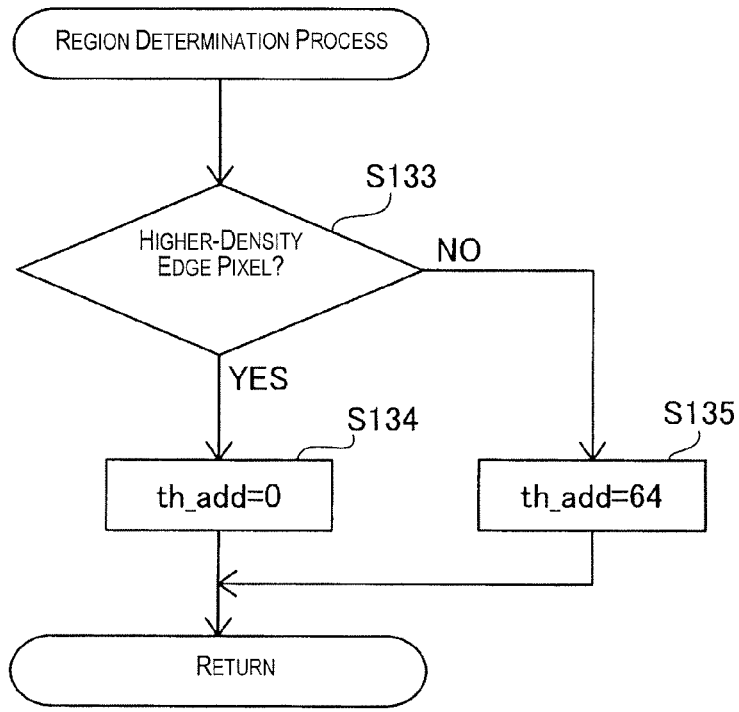
FIG. 4 is a flowchart showing the flow of region determination processing.

FIG. 4 is a flowchart showing the flow of the region determination process. When the region determination process is started, the CPU 40 performs processing for determining whether the denoted pixel (x, y) is a higher-density-side edge pixel (step S133 in FIG. 4). Specifically, the gradation values of pixels (also referred to hereinafter as pixels subject to difference study) at positions a predetermined distance D (where D is a positive integer) from the denoted pixel are subtracted from the gradation value of the denoted pixel, and a determination is made as to whether the difference thus calculated is greater than a predetermined threshold value (also referred to hereinafter as the edge determination threshold value EDGE_TH). The value of the distance D can be set at the design stage of the printing device, manually set by the user at the printing stage, automatically set by the printing device upon determining characteristics of the image data during printing process, or at various other stages.

In the case that D=1, for example, the pixels subject to difference study can be set as (x−1, y), (x+1, y), (x, y−1), and (x, y+1). The denoted pixel (x, Y) is determined to be a higher-density-side edge pixel when any of the following conditions are met:

date [x, y]−date[x−1, y]>EDGE_TH,
date [x, y]−date[x+1, y]>EDGE_TH,
date [x, y]−date[x, y−1]>EDGE_TH, or
date [x, y]−date[x, y+1]>EDGE_TH.

In these expressions, date[ . . . ] indicates the gradation value of the pixel with the coordinates enclosed by the brackets.

Figure 5:
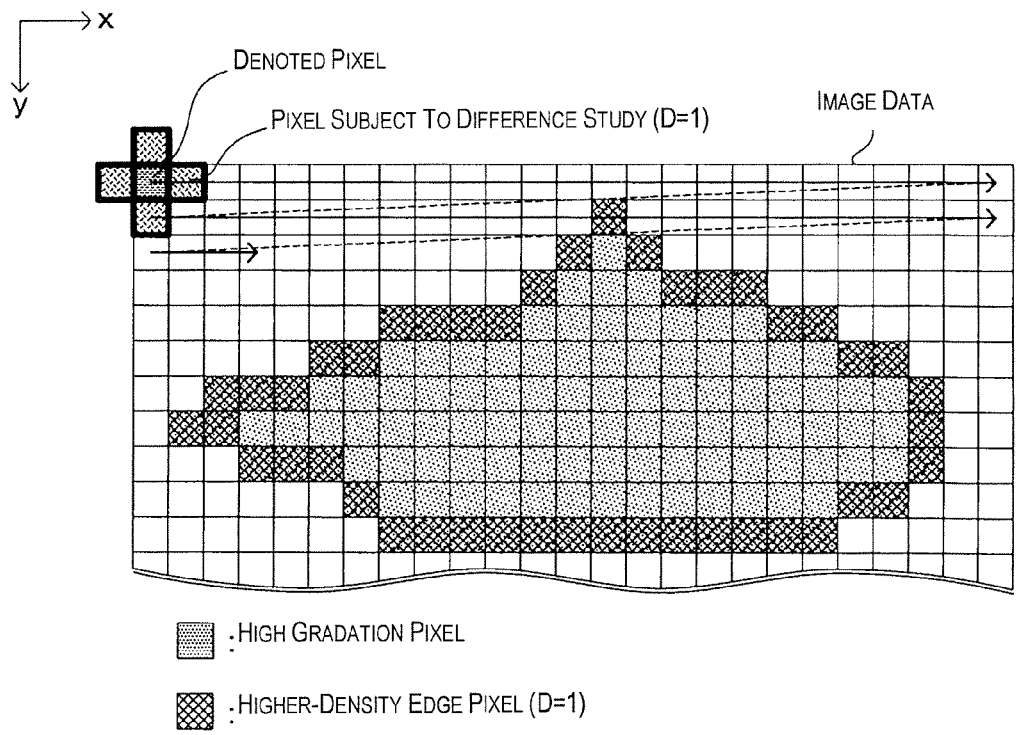
FIG. 5 is a view showing the manner in which region determination processing (D=1) is performed.

FIG. 5 is a view showing the manner in which region determination process is performed by the method described above. In the present example, the denoted pixel is moved from top to bottom and left to right in the image data in a case in which predetermined directions are designated as references in the printing image, i.e., a case in which an observer is directly facing the printing image. In this case, some pixels subject to difference study can be absent when the denoted pixel is positioned at a corner of the image data, but in this case, dummy pixels are set for the absent pixels subject to difference study, and region determination process is performed under the assumption that the gradation value of the dummy pixels are the same as the gradation value of the denoted pixel. In FIG. 5, pixels having higher-gradation values (also referred to hereinafter as higher-gradation pixels) are represented by dot hatching, and higher-density-side edge pixels are represented by cross hatching.

Figure 6:
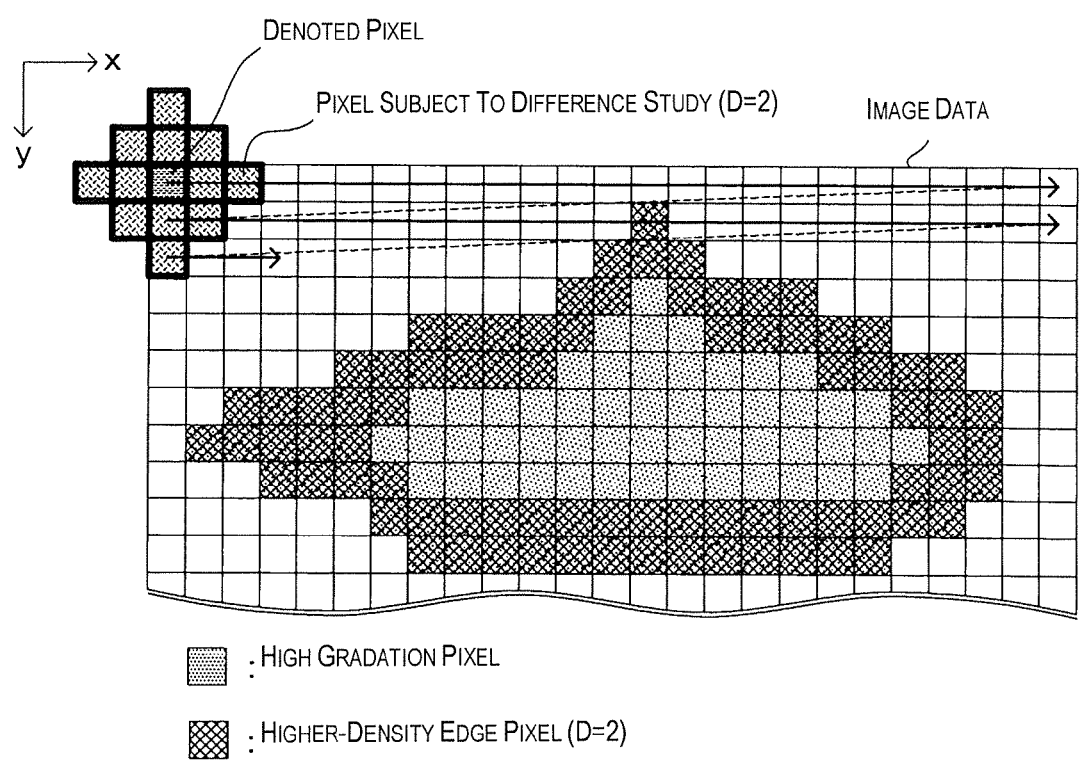
FIG. 6 is a view showing the manner in which region determination processing (D=2) is performed.

In the case that D=2, for example, the pixels obtained by adding (x−2, y), (x+2, y), (x, y−2), (x, y+2), (x−1, y−1), (x+1, y−1), (x−1, y+1), and (x+1, y+1) to the pixels subject to difference study of D=1 can be set as pixels subject to difference study. In the same manner as when D=1, a determination is made as to whether the denoted pixel is a higher-density-side edge pixel by size comparison with the edge determination threshold value EDGE_TH. FIG. 6 is a view showing the manner in which region determination process is performed when D=2.

In the case that the denoted pixel is determined to be a higher-density-side edge pixel (step S133: YES), the CPU 40 assigns a value of "0" to the threshold value fluctuation parameter th_add for the denoted pixel (step S134). On the other hand, in the case that the denoted pixel is determined to not be a higher-density-side edge pixel (step S133: NO), the CPU 40 assigns a value of "64" to the threshold value fluctuation parameter th_add for the denoted pixel (step S135). The CPU 40 performs the region determination process in this manner.

The description now returns to halftone process (FIG. 3). After assigning the threshold value fluctuation parameter th_add for each denoted pixel, the CPU 40 performs provisional dithering (step S141) as the process of the comparison unit 44. This provisional dithering is processing for comparing the sizes of the gradation value of the pixel data Dn and the value of a threshold value THn_d that corresponds to the pixel data Dn from among a plurality of threshold values which constitutes the dither mask 61 stored in the EEPROM 60. This process is formally the same process as that for determining the dot ON/OFF status by normal dithering. Essentially, in normal dithering, the ON state is determined for a dot when the gradation value of the pixel data Dn is equal to or greater than the threshold value THn_d, and the OFF state is determined for a dot when the gradation value of the pixel data Dn is less than the threshold value THn_d. However, the present example differs in that the provisional dithering is pre-processing for assigning an ON/OFF state to a dot by the error diffusion described hereinafter, i.e., processing for assigning an error diffusion threshold value.

As a result of provisional dithering, when the gradation value of the pixel data Dn is equal to or greater than the threshold value THn_d (step S141: YES), the threshold value THe used in error diffusion is set to a low-order threshold value THe_L (step S141). In setting the low-order threshold value THe_L, the CPU 40 subtracts the threshold value fluctuation parameter th_add assigned in the previous region determination process (step S132) from a reference error diffusion threshold value EDTH (128, for example) set in advance, and sets the resultant value as the low-order threshold value THe_L. For example, in the case that the denoted pixel is a higher-density-side edge pixel, since the threshold value fluctuation parameter th_add is equal to zero, the low-order threshold value THe_L is computed as EDTH−0. In the case that the denoted pixel is not a higher-density-side edge pixel, since the threshold value fluctuation parameter th_add is equal to 64, the low-order threshold value THe_L is computed as EDTH−64.

As a result of provisional dithering, when the gradation value of the pixel data Dn is less than the threshold value THn_d (step S141: NO), the threshold value THe used in error diffusion is set to a high-order threshold value THe_H (step S143). In setting the high-order threshold value THe_H, the CPU 40 adds the threshold value fluctuation parameter th_add assigned in the previous region determination process (step S132) to a reference error diffusion threshold value EDTH (128, for example) set in advance, and sets the resultant value as the high-order threshold value THe_H. For example, in the case that the denoted pixel is a higher-density-side edge pixel, since the threshold value fluctuation parameter th_add is equal to zero, the high-order threshold value THe_H is computed as EDTH+0. In the case that the denoted pixel is not a higher-density-side edge pixel, since the threshold value fluctuation parameter th_add is equal to 64, the high-order threshold value THe_H is computed as EDTH+64. A configuration is thus adopted in the present example whereby the threshold value THe used in error diffusion is changed on the basis of the result of provisional dithering.

When the threshold value THe is set, the CPU 40 adds a diffusion error Edn stored in a separately provided error buffer to the gradation value of the pixel data Dn (step S144). The diffusion error Edn is computed in step S148 described hereinafter, and the specifics thereof are described hereinafter.

When the diffusion error Edn is added to the gradation value of the pixel data Dn, the CPU 40 compares the gradation value of the pixel data Dn to which the diffusion error Edn is added and the threshold value THe set in step S142 or step S143 (step S145). As a result, when the gradation value of the pixel data Dn with the diffusion error Edn added thereto equal to or greater than the threshold value THe (step S145: YES), the ON state is assigned for the dot of the denoted pixel (step S146), and when the gradation value of the pixel data Dn with the diffusion error Edn added thereto is less than the threshold value THe (step S145: NO), the OFF state is assigned for the dot of the denoted pixel (step S147).

When the dot ON/OFF state is assigned, the CPU 40 computes a binarization error En and a diffusion error Edn (step S148). The binarization error En is the difference between the dot ON/OFF result (here, a gradation value of 255 or 0) and the gradation value of the pixel data Dn with the diffusion error Edn added thereto. The diffusion error Edn is the error in computing the gradation value of the pixel data Dn in step S144 described above. In the present example, the binarization error En is distributed as the diffusion error Edn for the surrounding pixels, whose dot ON/OFF states are unassigned, at a ratio of 7/16 for the neighboring pixel to the right of the denoted pixel, 3/16 for the pixel below and to the left, 5/16 for the pixel below, and 1/16 for the pixel below and to the right. The diffusion error Edn computed in this manner is stored in the error buffer.

The process of steps S144 through S148 is halftone process by error diffusion, and is executed as the process of the error diffusion unit 45. Since error diffusion is a publicly known technique, no detailed description thereof will be given, but error diffusion is a procedure whereby each item of image data is compared with a predetermined threshold value and quantized while a quantization error of each item of image data is added at a predetermined distribution ratio to the surrounding image data. In the example described above, steps S135 through S139 are binarization process for assigning only and ON or OFF value to a dot, but processing for converting to large dot and small dot ON/OFF data, or other multi-value process can be performed.

When the binarization error En and the diffusion error Edn are computed, the CPU 40 repeats the process of steps S131 through S139 with all the pixels as pixels of interest (step S149). The halftone process of step S130 (see FIG. 2) is thus completed.

The principle of this halftone process is described below using FIG. 7. As described above, in the process of steps S141 through S143, in the case that the gradation value of the pixel data Dn is equal to or greater than the threshold value THn_d, i.e., in the case that a dot ON state would occur were processing by dithering to be performed, the threshold value THe used in error diffusion is set to the low-order threshold value THe_L. In the case that the gradation value of the pixel data Dn is less than the threshold value THn_d, i.e., in the case that a dot OFF state would occur were processing by dithering to be performed, the threshold value THe is set to the high-order threshold value THe_H.

Here, the threshold value difference ΔTHe is defined as being equal to THe_H−THe_L, and a case is considered in which the threshold value difference ΔTHe is "0," i.e., the denoted pixel in the present example is a higher-density-side edge pixel (threshold value fluctuation parameter th_add=0). In this case, since the result of provisional dithering does not affect the threshold value THe, the process of steps S141 through S143 has no bearing on the final dot ON/OFF assignment by the error diffusion (steps S144 through S148). This means that in the halftone process of step S130, the final dot ON/OFF state is assigned solely by error diffusion method elements. In FIG. 7, error diffusion method elements are shown as being strong in the dot data characteristics.

A case will next be considered in which the threshold value difference ΔTHe is greater than zero (THe_H>THe_L), i.e., the denoted pixel in the present example is a pixel other than a higher-density-side edge pixel (threshold value fluctuation parameter th_add=64). In this case, when a dot ON state is determined by provisional dithering (the gradation value of the pixel data Dn is equal to or greater than the threshold value THn_d), the CPU 40 sets the threshold value THe to the correspondingly small low-order threshold value THe_L. On the other hand, when a dot OFF state is determined by provisional dithering (the gradation value of the pixel data Dn is less than the threshold value THn_d), the CPU 40 sets the threshold value THe to the correspondingly large high-order threshold value THe_H. In other words, when a dot ON state is determined by provisional dithering, the CPU 40 performs control so that a dot can readily be ON by error diffusion, and when a dot OFF state is determined by provisional dithering, the CPU 40 performs control so that a dot can readily be OFF by error diffusion. This means that the final results of dot ON/OFF determination by error diffusion are closer to the results of dot ON/OFF determination by provisional dithering than in a case in which the threshold value difference ΔTHe is zero. In other words, the final dot ON/OFF state is determined by dithering-type factors in addition to error diffusion method elements. In FIG. 7, dithering-type factors are shown as being strong in the dot data characteristics.

In short, by changing the threshold value THe according to the results of provisional dithering, i.e., by changing the size of the threshold value difference ΔTHe, the contribution of dithering-type factors and error diffusion method elements in halftone process can be controlled. In the present example, this principle is used to dynamically control the dithering-type factors and error diffusion method elements in halftone process according to whether the denoted pixel is a higher-density-side edge pixel. This can also be taken to mean that the degree of control of the likelihood of dot formation by error diffusion is controlled by the size of the threshold value difference ΔTHe.

As described above, when dot data are generated by error diffusion in the printer 20 configured as described above, the results of provisional dithering are used to control the likelihood of dot formation by error diffusion. In other words, the likelihood of dot formation by error diffusion is controlled using the result of dot ON/OFF determination for a case in which temporary dithering is used. Consequently, halftone process can be performed that incorporates dithering-type factors and error diffusion method elements.

Specifically, in the case that the result of provisional dithering indicates a dot ON state in the printer 20, the threshold value THe used in error diffusion is set to the low-order threshold value THe_L, and control is performed so that a dot is readily formed by error diffusion. In the case that the result of provisional dithering indicates a dot OFF state, the threshold value THe is set to the high-order threshold value THe_H, and control is performed so that a dot is not readily formed by error diffusion. In either of these cases of control, the presence or absence of dot formation is closer to the result of dithering than to the dot data produced merely by error diffusion, and dithering-type factors are therefore strengthened. Consequently, it is possible to set the degree of each type of control to a predetermined degree; i.e., it is possible to set the degree to which dithering-type factors and error diffusion method elements contribute in halftone process by appropriately setting the threshold value difference ΔTHe, or in the present example, by setting the size of the threshold value fluctuation parameter th_add. Since the likelihood of dot formation by error diffusion is controlled merely by changing the threshold value THe on the basis of the results of provisional dithering, a simplified configuration is obtained which contributes to increased processing speed.

The printer 20 of the present example is configured so that the threshold value difference ΔTHe is changed according to whether the pixels forming the image to be printed are higher-density-side edge pixels. Specifically, in the case that the denoted pixel is a higher-density-side edge pixel, error diffusion method elements in halftone process are strengthened by increasing the size of the threshold value difference ΔTHe, and in the case that the denoted pixel is not a higher-density-side edge pixel, dithering-type factors in halftone process are strengthened.

Since halftone process by error diffusion features excellent reproducability of both resolution and gradation, when error diffusion is applied to pixels forming the contours of fine lines and to surrounding pixels thereof in cases in which the image to be printed includes fine lines (e.g., text or line drawings) drawn at low density, the fine lines can be precisely reproduced without interruptions in the fine lines.

In halftone process by dithering, quality loss due to misalignment of the landing positions of ink dots can be suppressed by giving predetermined characteristics to the dither mask that is used. Generating a dither mask so as to have a high-order characteristic has not effect on execution speed during halftone process. Halftone process by dithering is thus extremely effective with regard to processing speed and in suppressing image degradation due to misalignment of landing positions in a beta region of the image to be printed.

In the present example, the reproducability of fine lines is increased by performing halftone process in which error diffusion method elements are strengthened for higher-density-side edge pixels of the image to be printed, and processing speed is increased and image degradation due to misalignment of the landing positions of ink dots is suppressed by performing halftone process in which dithering-type factors are strengthened in regions other than fine lines. Specifically, in the image data to be printed, halftone process is performed so that error diffusion method elements are strengthened in regions in which the merits of error diffusion are utilized over the merits of dithering, and dithering-type factors are strengthened in regions in which the merits of dithering are utilized over the merits of error diffusion. A printed image can therefore be obtained which has excellent reproduction of fine lines, and in which image degradation due to misalignment of landing positions of ink dots is suppressed.

A printed image having adequately excellent reproduction of fine lines can be obtained even when halftone process is performed in which error diffusion method elements are strengthened for pixels on a low-density side (also referred to hereinafter as low-density-side edge pixels) among edge pixels that constitute an edge, as well as for the higher-density-side edge pixels in the image to be printed. However, in the present example, halftone process is performed in which error diffusion method elements are strengthened only for higher-density-side edge pixels. Specifically, processing speed can be increased by reducing the number of regions for which time-consuming halftone process having strengthened error diffusion method elements is performed.

Corresponding relationships with the claims are as follows. The halftone processor 42 corresponds to the dot data generator described in the claims, and the gradation value of the pixel data Dn with the diffusion error Edn added thereto corresponds to the corrected gradation value described in the claims. Steps S134, S135, and S141 through S143 shown in FIGS. 3 and 4 correspond to the functions of the determination value adjustment unit described in the claims, and steps S144 through S148 correspond to the functions of the dot data generator described in the claims.

B. Modifications

Figure 8:
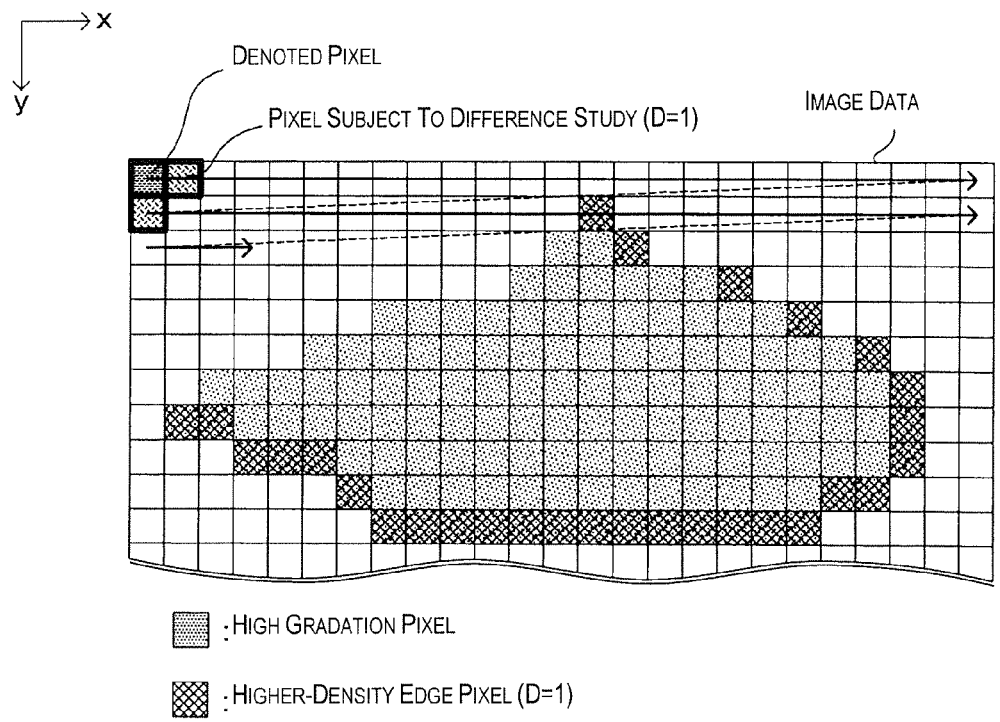
FIG. 8 is a view showing the manner in which the region determination processing (D=1) in Modification 1 is performed.
Figure 9:
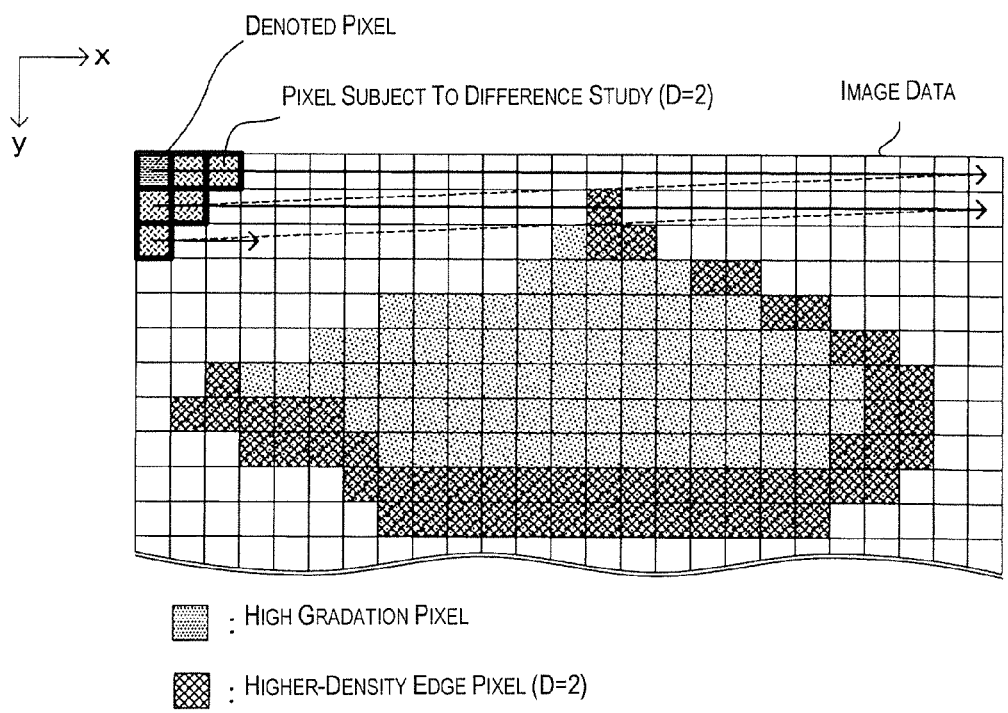
FIG. 9 is a view showing the manner in which the region determination processing (D=2) in Modification 1 is performed.

The invention is not limited to the examples or embodiments described above, and can be implemented in various forms within the intended scope thereof. For example, such modifications as those described below are possible.
(B1) Modification 1:
In the example described above, halftone process in which error diffusion method elements are strengthened is performed for all edge pixels above, below, to the left, and to the right in a line drawing region (in the case of the first example, the edge pixels that are higher-density-side edge pixels), but halftone process in which error diffusion method elements are strengthened can also be performed only for one side of an edge. Specifically, halftone process in which error diffusion method elements are strengthened is performed only for edge pixels on the right side or left side of a left-right edge, and only for edge pixels on the top side or bottom side of a top-bottom edge. In this case, by setting the pixels subject to difference study as shown in FIG. 8 or FIG. 9, the application of halftone process in which error diffusion method elements are strengthened can be restricted to only the higher-density-side edge pixels on one side in a line drawing. In low-density fine lines, since dots still occur near edges in which error diffusion method elements are strengthened, fine lines can be printed with excellent reproducability and without interruptions in the fine lines.

In the case that halftone process in which error diffusion method elements are strengthened is performed for only one side of an edge as described above, when, considering the relationship with the direction (also referred to as the processing direction) in which the denoted pixel is moved in the image data, halftone process in which error diffusion method elements are strengthened is performed for edge pixels at the rear of the line drawing region in the processing direction, i.e., for edge pixels at the right and edge pixels at the bottom of the line drawing region, line drawings can be printed with particularly excellent reproducability.

When that halftone process in which error diffusion method elements are strengthened is performed for edge pixels at the rear of the line drawing region, in the case that no dots occur in the line drawing region (the region in which dithering-type factors are strong) before the rear, the effect of the diffusion error makes dots occur more readily in rear edge pixels, i.e., pixels for which error diffusion method elements are strengthened. When halftone process in which error diffusion method elements are strengthened is performed for edge pixels at the front of the line drawing region, i.e., edge pixels at the left and edge pixels at the top of the line drawing region in the case that processing is directed left to right and top to bottom, in the case that no dots occur in the edge pixels, the diffusion error Edn is diffused by the surrounding pixels. Specifically, the diffusion error Edn is diffused by also by the pixels at the rear in the processing direction and is reflected in the halftone process for the rear pixels. However, since dithering-type factors are strong in the rear pixels, the effect of the diffusion error is essentially suppressed, and dots less readily occur than in the case of performing halftone process in which error diffusion method elements are strengthened for the edge pixels at the rear in the processing direction. For this reason, in the case that halftone process in which error diffusion method elements are strengthened is performed only for one side of an edge, line drawings can be printed with particularly excellent reproducability by performing halftone process in which error diffusion method elements are strengthened for edge pixels at the rear of the line drawing region in the processing direction.

(B2) Modification 2:

In the example described above, the pixels in the image data are divided into two types of regions in which processing with strengthened error diffusion method elements and processing with strengthened dithering-type factors is performed, but an intermediate region (also referred to hereinafter as a transition region) between these two types of regions can also be provided for halftone process. Specifically, the threshold value fluctuation parameter th_add is set to a value between the region in which error diffusion method elements are strengthened and the region in which dithering-type factors are strengthened. In the configuration of the first example, it is possible to perform halftone process in which dithering-type factors and error diffusion method elements are placed at a middle degree by setting the threshold value fluctuation parameter th_add equal to zero (see FIG. 4) in regions in which dithering-type factors are strengthened, setting the threshold value fluctuation parameter th_add equal to 64 in regions in which error diffusion method elements are strengthened, and setting the threshold value fluctuation parameter th_add equal to 32, for example, in transition regions.

As a method for providing the transition region, in the method of the first example for detecting the higher-density-side edge pixels, the pixels detected by the pixels subject to difference study at distance D=1 described in FIG. 5 are designated as the pixel region in which error diffusion method elements are strengthened (threshold value fluctuation parameter th_add=64), the pixels other than those detected at D=1 of the pixels detected by the pixel subject to difference at distance D=2 described in FIG. 6 are designated as the transition region (threshold value fluctuation parameter th_add=32), and the remaining pixels are designated as the pixel region in which dithering-type factors are strengthened (threshold value fluctuation parameter th_add=0). Through this configuration, a transition region is provided as an intermediate region between the region of strengthened dithering-type factors and the region of strengthened error diffusion method elements, halftone process can be performed in which there is a stepwise transition between dithering-type factors and error diffusion method elements, and the boundary at which the threshold value fluctuation parameter th_add is switched can be prevented from being recognizable in the printed image.

Not only the transition region described above, but a plurality of transition regions can be provided so as to create a continuous transition from a region of strengthened dithering-type factors to a region of strengthened error diffusion method elements. Specifically, the number of transition regions can be set to two or three for halftone process by using pixels subject to difference study with distance D=3 or pixels subject to difference study with distance D=4.

(B3) Modification 3:

In the example described above, halftone process in which error diffusion method elements are strengthened is performed for edge pixels that are higher-density-side edge pixels, but this configuration is not limiting, and halftone process in which error diffusion method elements are strengthened can also be performed for edge pixels including low-density-side edge pixels. For example, in the case of D=1 (see FIG. 5), the pixels subject to difference study are set as (x−1, y), (x+1, y), (x, y−1), and (x, y+1), and the denoted pixel (x, Y) is determined to be an edge pixel when any of the following conditions are met:

date [x, y]−date[x−1, y]>EDGE_TH,
date [x, y]−date[x+1, y]>EDGE_TH,
date [x, y]−date[x, y−1]>EDGE_TH, or
date [x, y]−date[x, y+1]>EDGE_TH.

Halftone process in which error diffusion method elements are strengthened is performed for the edge pixels detected in this manner. Printing process having excellent reproducability of low-density fine lines can be performed in this case as well.

(B4) Modification 4:

In the example and modifications described above, an edge pixel is detected by computing the size of the differential between the gradation of a denoted pixel and the gradation of a pixel subject to difference study, but this configuration is not limiting, and since pixels that form characters or line drawings are self-evident in cases in which the data to be printed are vector data or text data, for example, pixels that form contours, i.e., edge pixels, can easily be detected by processing the inputted data so as to flag pixels which form characters or line drawings. This method of detecting edge pixels enables a further increase in processing speed.

(B5) Modification 5:

In the halftone process of the embodiment described above, the gradation values of the pixel data Dn are compared with various threshold values to determine dot ON/OFF states by provisional dithering or error diffusion, but a configuration can be adopted in which the gradation values of the pixel data Dn are converted to recording rates on the basis of a predetermined conversion rule, and gradation values of the recording rates are compared with the various threshold values. The recording rate is the ratio at which dots are recorded for a pixel in an arbitrary region. For example, in a case in which the printer 20 forms an image out of dots of a plurality of sizes, such as large dots or small dots, a gradation value of a recording rate computed for each dot size on the basis of the gradation value of the pixel data Dn can be compared with the various threshold values.

(B6) Modification 6:

In the embodiment described above, the printer 20 is configured so as to execute all the printing process shown in FIG. 2, but in a case in which printing process is performed in a printing system (a printing device in the broad sense) in which a printer and a computer are connected, some or all of the printing process or halftone process can be performed by the computer or the printer.

Embodiments of the invention are described above, but the invention is not limited to these embodiments and can, of course, be implemented in various ways within the intended scope thereof. For example, the invention is not limited to application in a serial inkjet printer such as described in the embodiments, and can be applied in inkjet line printers, laser printers, and various other types of printing devices. Besides the printing device configuration described above, the invention can be realized as a printing method, program, storage medium, or the like.

What is claimed is:

1. An image processing device for processing image data which indicate an image by a gradation value for each pixel, the image processing device comprising:
    an image data input unit configured to input the image data;
    a dot data generator configured to perform processing for generating dot data which indicate the presence or absence of dot formation from the image data; and
    a dot data output unit configured to output generated dot data,
    the dot data generator including
        an edge determination unit configured to determine whether a pixel included in the image data is an edge pixel for which the difference in gradation value in relation to an adjacent pixel is equal to or greater than a predetermined value, and
        a determination value adjustment unit configured to compare a gradation value of the pixel included in the image data to a threshold value of a dither mask prepared in advance, and adjust, using a first value range, a determination value, in the case that the pixel is determined to be the edge pixel by the edge determination unit, the first value range being smaller than a second value range used for adjusting a determination value for a non-edge pixel,
    the dot data generator performing an error diffusion process of the image data by using the adjusted determination value, and generating the dot data.

2. The image processing device according to claim 1, wherein
    the dot data generator further includes
    a generator configured to perform processing for generating dot data which indicate the presence or absence of the dot formation by applying error diffusion for comparing the adjusted determination value with a corrected gradation value obtained by correcting the gradation value of the pixel by the diffusion error from an adjacent processed pixel, and diffuse the error with respect to the gradation value that occurs according to the presence or absence of the dot formation when the presence or absence of formation of a dot is determined by the comparison.

3. The image processing device according to claim 2, wherein
    the determination value adjustment unit adjusts the determination value by a predetermined width so that the determination value that is applied in the case that the gradation value of the pixel exceeds the threshold value does not exceed the determination value that is applied in the case that the gradation value of the pixel is equal to or less than the threshold value.

4. The image processing device according to claim 2, wherein
    the determination value adjustment unit increases the width of the adjustment of the determination value through a plurality of levels as the distance from the edge pixel increases when the determination value is applied to a pixel other than the edge pixel.

5. The image processing device according to claim 2, wherein
    the determination value adjustment unit determines that either a pixel on a higher-gradation side or a pixel on a low-gradation side is the edge pixel among pixels in which the difference in gradation value with respect to an adjacent pixel is equal to or greater than a predetermined value.

6. The image processing device according to claim 2, wherein
    the width of the adjustment of the determination value for the edge pixel is zero.

7. The image processing device according to claim 1, wherein
    the dither mask has a blue noise characteristic.

8. The image processing device according to claim 1, wherein
    the determination value is an error diffusion threshold value.

9. An image processing method for processing image data which indicate an image by a gradation value for each pixel, the image processing method comprising:
    inputting the image data;
    generating dot data which indicate the presence or absence of dot formation from the image data; and
    outputting generated dot data,
    the generating of the dot data including
        determining whether a pixel included in the image data is an edge pixel for which the difference in gradation value in relation to an adjacent pixel is equal to or greater than a predetermined value,
        comparing a gradation value of the pixel included in the image data to a threshold value of a dither mask prepared in advance, and adjusting, using a first value range, a determination value, in the case that the pixel is determined to be the edge pixel by the edge determination unit, the first value range being smaller than a second value range used for adjusting a determination value for a non-edge pixel, and performing an error diffusion processing of the image data by using the adjusted determination value and generating the dot data.

10. The image processing method according to claim 9, wherein the determination value is an error diffusion threshold value.

* * * * *